US006591366B1

(12) United States Patent
Munker et al.

(10) Patent No.: US 6,591,366 B1
(45) Date of Patent: Jul. 8, 2003

(54) METHOD AND CONFIGURATION FOR LOADING DATA FOR BASIC SYSTEM ROUTINES OF A DATA PROCESSING SYSTEM

(75) Inventors: Thomas Munker, Neuburg/Donau (DE); Helmut Altmann, Germering (DE); Uwe Michel, Königsbrunn (DE)

(73) Assignee: Fujitsu Siemens Computer GmbH, Munich (DE)

( * ) Notice: Subject to any disclaimer, the term of this patent is extended or adjusted under 35 U.S.C. 154(b) by 419 days.

(21) Appl. No.: 09/580,980

(22) Filed: May 30, 2000

Related U.S. Application Data

(63) Continuation of application No. PCT/DE98/03485, filed on Nov. 26, 1998.

(30) Foreign Application Priority Data

Nov. 27, 1997 (DE) .......................... 197 52 615

(51) Int. Cl.[7] .............................. G06F 9/00; G06F 12/14
(52) U.S. Cl. ........................... 713/200; 713/100
(58) Field of Search ........................ 713/1, 2, 100, 713/200, 201, 202; 711/100, 170

(56) References Cited

U.S. PATENT DOCUMENTS

| | | | | |
|---|---|---|---|---|
| 5,444,642 A | * | 8/1995 | Montogomery et al. | 702/91 |
| 5,530,858 A | | 6/1996 | Stanley et al. | |
| 5,535,416 A | * | 7/1996 | Feeney et al. | 710/14 |
| 5,632,032 A | * | 5/1997 | Ault et al. | 709/100 |
| 5,640,562 A | * | 6/1997 | Wold et al. | 713/2 |
| 5,671,442 A | * | 9/1997 | Feeney et al. | 710/14 |
| 5,696,897 A | * | 12/1997 | Dong | 714/15 |
| 5,835,761 A | * | 11/1998 | Ishii et al. | 713/100 |
| 5,978,912 A | * | 11/1999 | Rakavy et al. | 713/2 |
| 5,991,822 A | * | 11/1999 | Mealey et al. | 709/301 |
| 6,173,417 B1 | * | 1/2001 | Merrill | 714/15 |
| 2001/0044904 A1 | * | 11/2001 | Berg et al. | 713/201 |
| 2003/0037252 A1 | * | 2/2003 | Abrams | 713/200 |

FOREIGN PATENT DOCUMENTS

| | | | | |
|---|---|---|---|---|
| DE | 19752615 C1 | * | 4/1999 | G06F/9/445 |
| DE | 19946959 A1 | * | 4/2001 | G06F/9/445 |
| GB | 2 290 890 A | | 1/1996 | |
| WO | WO 99/14881 A2 | * | 3/1999 | H04L/9/00 |
| WO | WO 99/28804 A2 | * | 6/1999 | G06F/1/00 |

OTHER PUBLICATIONS

Every, "What is an OS" Jan. 31, 1999, http://www.mackido.com/Software/WhatsAnOS.html, p. 1–6.*
"Programming in the Mac OS X Kernel" 2001, wysiwyg://15http://developer.apple.com...vers/Intro/Programming_OS_X_Kernel.html, p. 1.*
"What are device drivers?" Jun. 1999, http://ou800doc.caldera.com/HDK–basics/driv_descr.html, p. 1–2.*
Schmitt, "Designing drivers for OS–2: operating environments" Dec. 1987, PC Tech Journal, V 5, Dialog Text Search, p. 164–179.*
Treglown, "Operating Systems" 2001, The University of Nottingham School of Computer Science and Information Technology, p. 1–20.*
Georg Schnurer: "Vom Umgang mit Treiber und BIOS–Updates" [using driver and BIOS updates], c't 1997, No. 2, pp. 106–110.

* cited by examiner

Primary Examiner—Norman M. Wright
Assistant Examiner—Christopher Revak
(74) Attorney, Agent, or Firm—Laurence A. Greenberg; Werner H. Stemer; Ralph E. Locher

(57) ABSTRACT

A new operating system is provided with two layers having different access authorizations. For security reasons a memory for basic system routines can be accessed only from a kernel layer, but not from an application layer. By providing a respective program that is executable in the respective layer, it is possible, while complying with the security stipulations, for the memory to be accessed and, consequently, for a new version of the basic system routines to be made available to the data processing system.

9 Claims, 1 Drawing Sheet

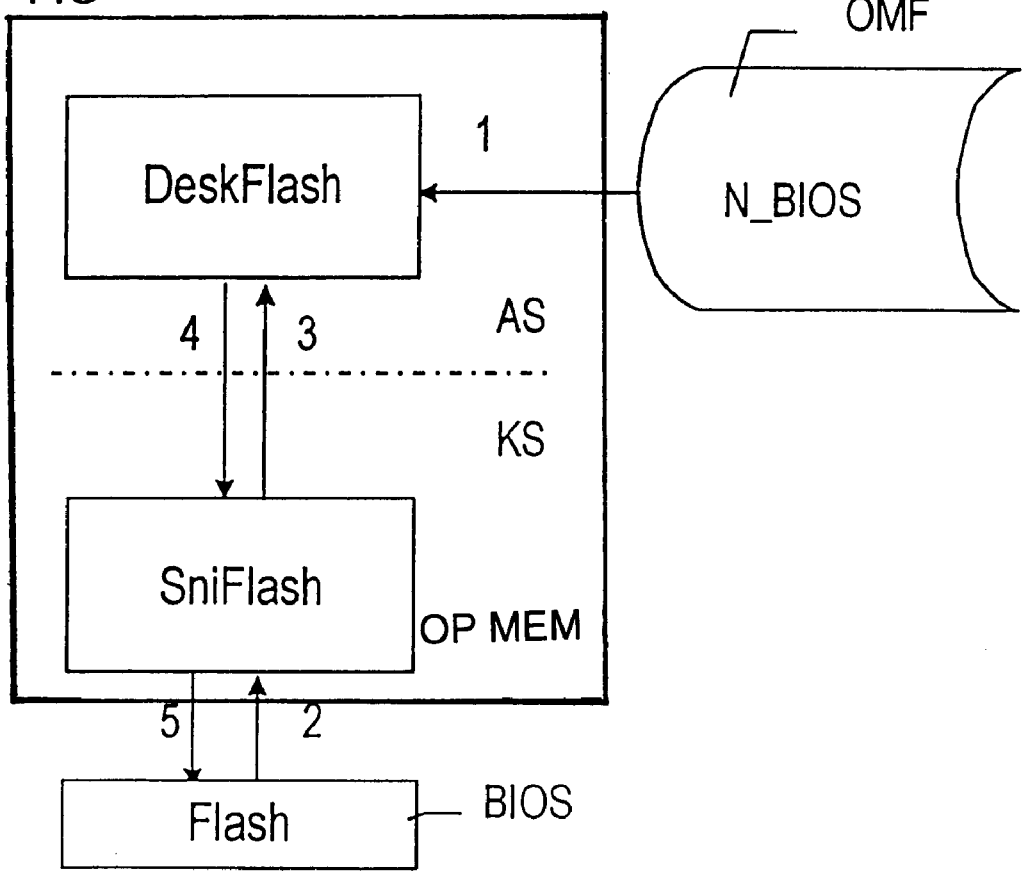

METHOD AND CONFIGURATION FOR LOADING DATA FOR BASIC SYSTEM ROUTINES OF A DATA PROCESSING SYSTEM

CROSS-REFERENCE TO RELATED APPLICATION

This is a continuation of copending International Application PCT/DE98/03485, filed Nov. 26, 1998, which designated the United States.

BACKGROUND OF THE INVENTION

Field of the Invention

The invention relates to a method and a configuration for loading data.

Data processing systems, such as personal computers for example, usually become fully functionable only after an operating system has been loaded. Even without an operating system, the data processing systems require a basic functionality that enables elementary operations to be executed. Examples of such elementary operations are routines for the inputting of characters via a keyboard and the outputting thereof on the screen and the printer, a routine for the loading of the operating system into the main memory, and also test routines for a self-test that runs automatically when the data processing system is switched on. These operations are also referred to as basic system routines. The data required for executing these system routines are stored permanently in a non-volatile memory module in a data processing system, for example PROM, EPROM, FLASH, etc. Another term used in this context is basic input output system (BIOS).

The document: c't 1997 Issue 2, Pages 106–110 has already disclosed calling suitable driver and application programs during the loading of BIOS data.

Since the basic system routines significantly influence the method of operation of the data processing system, it is sometimes necessary to use a revised version of the basic system routines in the data processing system. This can be done by exchanging the memory module PROM. If, instead of a non-overwritable PROM, an overwritable memory module, for example EEPROM, or a FLASH module is present in the data processing system, then the basic system routines can be loaded into the memory module.

In order to transfer the data for the new basic system routines, special programs are used which cooperate with conventional operating systems (i.e. Microsoft DOS). During the loading of the customary operating systems, a copy of the data from the non-volatile memory for basic system routines is stored in the main memory of the data processing system. If a functionality defined in the basic system routines is required, recourse is had to this copy in the main memory. However, the co-operation with the copy of the basic system routines results in disadvantages in respect of security, since the copied data can be altered in a comparatively simple manner by circumventing the write protection. Therefore, recent operating systems (IBM OS/2, Microsoft Windows 95 and Microsoft Windows NT) strive for executability that is possible without recourse to a copy of the basic system routines in the main memory of the data processing system.

On account of such security considerations, the recent operating systems do not support the loading of a new version of the basic system routines into the non-volatile memory module. Only programs of an application layer of the operating system are available to the user. The user has no access to programs in a kernel layer of the operating system for which access to functional elements of the data processing system which are essential to security is allowed. Therefore, the data processing system always has to be rebooted, that is to say restarted, for the loading of a new version for basic system routines. This restart must then be performed by use of another operating system, which supports at least the loading of the new version of the basic system routines. If such an operating system is loaded, security mechanisms of the operating system that is actually provided for the operation of the data processing system cannot take effect. As a result, it becomes possible to access other data stored within the data processing system. Moreover, these data can be altered in an impermissible manner by so-called viruses in such a way that functional disturbances may occur during later regular operation.

SUMMARY OF THE INVENTION

It is accordingly an object of the invention to provide a method and a configuration for loading data for basic system routines of a data processing system that overcome the above-mentioned disadvantages of the prior art methods and devices of this general type, which largely precludes security risks during the loading of the data.

With the foregoing and other objects in view there is provided, in accordance with the invention, a data loading method, which includes:

calling an application program stored in an application layer, the application program initiating a loading of information with regard to hardware components from a file containing new data for basic system routines into a main memory of a data processing system;

checking if a respective user has authorization in an event that the application program is called;

calling a driver program in a kernel layer by the application program, the driver program being prompted to read and transfer information regarding the hardware components stored in a non-volatile memory;

transferring the new data for the basic system routines and information for controlling a loading operation of the new data for the basic system routines into the non-volatile memory from the application program to the driver program; and writing the new data for the basic system routines to the non-volatile memory, in this manner the new data for the basic system routines can be written into the non-volatile memory by the driver program from the kernel layer without a corresponding access from the application layer.

By virtue of the use of two different programs, the application program and the driver program, which can be called and are executable in the application layer and in the kernel layer, respectively, the data processing system can be operated unchanged with its intended operating system, which is protected against manipulation, during the loading operation. Impermissible circumventing of the security techniques of the operating system is thus precluded. Unauthorized overwriting of the basic system routines is thus effectively prevented. Authorization for calling the application program can be assigned for example to those users who also have administrator authorizations. The data processing system cannot be infected with viruses, provided that the operating system contains suitable protection mechanisms for combating them.

Only the data of the new version of the data for basic system routines have to be made available to the data processing system. These are transferred to the driver program by the application program. The driver program, which cannot be accessed from the application layer, transfers the data to the non-volatile memory.

In accordance with an added feature of the invention, there are the steps of using the application program for performing a comparison for ascertaining an association of the information with regard to the hardware components stored in the new data for the basic system routines with the information regarding the hardware components stored in the non-volatile memory, and ending operations if no correspondence is determined in the comparison.

Using a data comparison, it can be ensured that only those new system routines which the hardware components of the data processing system can actually process are loaded into the non-volatile memory of the data processing system. By way of example, it is thus ensured that the existing type of system board (motherboard) and of the memory and functional modules that are disposed on it correspond to the types of boards and modules which are demanded in the new data. It is thus ensured that the data processing system is fully functional after the loading operation of the basic system routines.

It is furthermore provided that the application program accepts so-called location information from the file with the new data for basic system routines. On the basis of this location information, the application program splits the new data into packets that are provided with corresponding location information items and transferred to the driver program. As a result of the data being transferred in portions in this way, the method of operation of the operating system and of other current application programs of the data processing system is adversely affected only to an insignificant extent. Consequently, the new data of the basic system routines can also be loaded during the regular operation of the data processing system.

In this case, the portion size can be matched to the parameters of the non-volatile memory. The smallest packet corresponds to the smallest storage unit of the non-volatile memory, and the largest packet corresponds to the volume of data that can be transferred into the non-volatile memory in the course of a loading operation. In the case of customary non-volatile memories, the smallest volume of data is 1 byte and the largest volume of data is 64 Kbytes.

The driver program is adapted to the requirements of the non-volatile memory. The non-volatile memories, in particular the FLASH memories, are generally organized in sectors, in which case specific address ranges can be written to within individual memory sectors. However, the erasure operation can only be performed for an entire sector. If we suppose that the application program supplies the information according to which the transferred data are intended for the sector i and are to be written to the address k to k+n therein, then the driver program firstly ascertains whether it has already erased the sector in a previous operation. If this is the case, then the erasure operation at the current point in time can be omitted and it is only necessary for the data to be written to the addresses k to k+n. A customary value for n is 1000, with the result that one K-byte is transferred each time the data are transferred from the application program to the driver program. Such a volume of data adversely affects the functionality of the operating system and of the other current applications only to an extremely small extent. As an alternative, the application program can also undertake the above-described functionality of the driver program, according to which it is necessary to ascertain whether a sector had already been erased in a previous operation. In this case, the driver program would merely follow the corresponding instructions of the application program.

In accordance with a further refinement and development of the invention, the application program can be started by remote access. This functionality enables a system administrator to install new basic system routines during routine operation in a computer network in the framework of a batch run using a software distribution tool on a plurality of data processing systems. When the application program is called, only the necessary parameters such as, for example, the authorization information and the new data have to be transferred by the batch.

With the foregoing and other objects in view there is further provided, in accordance with the invention, a data loading configuration, including:

a non-volatile memory;

a file containing new data for basic system routines;

a data processing system loaded with an operating system and having a main memory connected to the file, the operating system having a kernel layer and an applications layer, the application layer having an application program which can be called and initiates a loading of information with regard to hardware components from the file containing the new data for the basic system routines into the main memory, the kernel layer having a driver program which can be called by the application program and serving for reading and transferring information with regard to the hardware components stored in the non-volatile memory;

a first coupling connecting the application program to the driver program, such that it is possible to transfer the new data for the basic system routines and information for controlling a loading operation of the new data for the basic system routines into the non-volatile memory; and a second coupling connecting the driver program to the non-volatile memory, such that the new data for the basic system routines can be written to the non-volatile memory, in this manner the new data for the basic system routines can be written into the non-volatile memory by the driver program from the kernel layer without a corresponding access from the application layer.

Other features which are considered as characteristic for the invention are set forth in the appended claims.

Although the invention is illustrated and described herein as embodied in a method and a configuration for loading data for basic system routines of a data processing system it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE DRAWING

The single FIGURE of the drawing is a block diagram of a configuration of components and the transfer directions of data.

DESCRIPTION OF THE PREFERRED EMBODIMENT

Referring now to the single FIGURE of the drawing in detail, there is shown one example of the invention. The FIGURE shows a block diagram schematically illustrating a configuration of components and transfer directions of associated data. Basic system routines are designated as BIOS in the text below. In a data processing system, a non-volatile memory, designated as Flash below, is disposed on a non-illustrated system board. The non-volatile memory Flash is a memory module whose memory is divided into sectors with a size of 64 K bytes. Individual bytes can be addressed and written to within the sectors. An erasure operation can be carried out only for an entire sector in each case.

The data processing system can load an operating system into its main operating memory of MEM with the aid of the BIOS stored in the non-volatile memory Flash, as a result of which it is put into an operational state. The operating system is provided with two hierarchical layers AS, KS, proceeding from which the data processing system can be accessed differently. From a kernel layer KS, programs disposed therein can access hardware elements of the data processing system. In the kernel layer, a driver program SniFlash, inter alia, is assigned which is able to read the data from the non-volatile memory Flash, to erase data and to write data to the non-volatile memory Flash. The second layer of the operating system, the application layer AS, is assigned application programs that are not permitted to access parts of the data processing system which adversely affect or circumvent the security of the operating system. One application program which is disposed in the application layer AS is the application program DeskFlash, which is provided for the loading of a new BIOS version $N_{13}$ BIOS. By use of the application program DeskFlash and the driver program SniFlash, data can be interchanged across the layer boundaries between application layer AS and kernel layer KS.

The application program DeskFlash can be performed directly on the data processing system by being called by the user of the system. As an alternative to this, the application program DeskFlash can be started by a remote access with the aid of a software distribution tool. With the aid of the software distribution tool, a system administrator can communicate parameters to selected data processing systems via a network that connects a plurality of the data processing systems, the parameters starting a batch run on the respective data processing systems. The parameter transfers that are necessary for starting the application program DeskFlash are then performed in the framework of the batch run.

At the start of the application program DeskFlash, a check is made to see whether the user who has initiated the initialization of the application program DeskFlash belongs to the user group of administrators. Only the group of administrators is authorized to start the application program DeskFlash. If such authorization is not present and if it has also not been verified in the framework of the alternatively possible remote access using parameters, the execution of the application program DeskFlash is terminated. Unauthorized persons thus cannot load a new BIOS version $N_{13}$ BIOS into the data processing system.

If the required authorization has been able to be verified, then the application program DeskFlash first opens a file OMF, in which the new BIOS data $N_{13}$ BIOS are made available. Information regarding the data processing system with the system boards and functional modules for which the present new BIOS version $N_{13}$ BIOS is suitable is also available in the file OMF. The data are first read by the application program DeskFlash by the route designated by 1 in the FIGURE. In the second step, the application program DeskFlash requests the driver program SniFlash, by a route designated by 4, to read from the non-volatile memory Flash the data regarding the system board and the modules situated thereon for which the previous BIOS could be used. The operation is carried out by the driver program SniFlash via the routes designated by 5 and 2. The data that have been read are transferred by the driver program SniFlash to the application program DeskFlash by the route designated by 3. The data, then available to the application program DeskFlash, concerning the system board and the functional modules situated thereon of the BIOS previously present in the non-volatile memory Flash and the new BIOS data $N_{13}$ BIOS available in the OMF file are compared by the application program DeskFlash. In the case of identity, the existing BIOS version can be overwritten by the new BIOS version $N_{13}$ BIOS. Otherwise, the user is informed that there is a lack of correspondence between the old BIOS and the new BIOS version $N_{13}$ BIOS, and the application program DeskFlash is subsequently ended.

By the route 1, the application program DeskFlash then reads the data of the file OMF and evaluates them according to predetermined rules. These rules determine how a header information item should be interpreted. The file OMF contains the header information item, from which it is possible to derive which contents of the file OMF are to be written at which locations in the non-volatile memory Flash. Taking account of this information, the application program DeskFlash performs further splitting into smaller packets, which may also contain location information—to which sector of the non-volatile memory Flash and at which address within the sector the data are to be written. The addition of the information to the packets which are transferred to the driver program SniFlash via the route 4 can be dispensed with only when it is ensured that no loss of data can occur with serial transfer of the packets.

The first packet of data that are to be written in a specific sector of the non-volatile memory Flash contains the identifier of the sector and the start address starting from which the data of the present packet and of the subsequent packets have to be written. The data packets have a size of 1 K byte, as a result of which the operation of the operating system and of other application programs running under it is adversely affected only to a slight extent If the driver program SniFlash receives a data packet via the route 4, it first interprets the location information assigned to it. If no location information has been added, it writes the data of the packet via the route 5 following the previously written data to the corresponding sector of the non-volatile memory Flash. If a location information item is present, a check is first made to see whether that sector of the non-volatile memory Flash which is identified in the location information item has already been erased and data from previous packets have already been entered there. If this is the case, the data of the current packet are written at the locations which are identified in the location information item, for example beginning with the address k up to the address k+1000. However, if that sector of the non-volatile memory Flash which is identified in the location information item is a sector which has not yet been erased and, accordingly, still contains data of the old BIOS, then the driver program SniFlash initiates the erasure of the corresponding sector of the non-volatile memory Flash. Only afterwards does it write the data of the packet at the addresses specified in the location information item.

The driver program SniFlash optionally informs the application program DeskFlash, via the route 3, of whether the writing of a data packet to the non-volatile memory Flash was able to be performed successfully. The absence of such a message or the presence of an appropriate error message prompts the application program DeskFlash to make a further attempt at writing the data, the application program once again transferring corresponding data packets to-the driver program SniFlash via the route 4. Only when there is repeatedly an error message from the driver program SniFlash are further measures initiated, such as user information, writing of already erased data back to the non-volatile memory Flash, and the like.

If the loading operation has been concluded successfully for all sectors of the non-volatile memory Flash then the user is requested by the application program DeskFlash to reboot the data processing system. If the user does not follow this proposal, the data processing system can continue to be operated with the old BIOS until the next booting operation.

Although the present invention has been explained using an example in a specific form, it is not thereby restricted. Similar solutions that result in other embodiments may be found by the person skilled in the art, without the solutions lying outside the scope of protection of the present invention.

We claim:

1. A data loading method, which comprises:
    calling an application program stored in an application layer, the application program initiating a loading of information with regard to hardware components from a file containing new data for basic system routines into an operating memory of a data processing system;
    checking if a respective user has authorization in an event that the application program is called;
    calling a driver program in a kernel layer by the application program, the driver program being prompted to read and transfer information regarding the hardware components stored in a non-volatile memory;
    transferring the new data for the basic system routines and information for controlling a loading operation of the new data for the basic system routines into the non-volatile memory from the application program to the driver program; and
    writing the new data for the basic system routines to the non-volatile memory, such that the new data for the basic system routines can be written into the non-volatile memory by the driver program from the kernel layer without a corresponding access from the application program of the application layer.

2. The method according to claim 1, which comprises using the application program for performing a comparison for ascertaining an association of the information with regard to the hardware components stored in the new data for the basic system routines with the information regarding the hardware components stored in the non-volatile memory, and ending operations if no correspondence is determined in the comparison.

3. The method according to claim 1, which comprises using the application program for performing the steps of:
    ascertaining from the file containing the new data for the basic system routines location information regarding where in the non-volatile memory the new data for the basic system routines are to be written; and
    splitting the new data for the basic system routines into packets and transferring the packets with corresponding location information items to the driver program.

4. The method according to claim 3, which comprises using the driver program for first erasing old data from a memory area of the non-volatile memory to which the packets received are intended to be written, and then writing the new data for the basic system routines at least partially to an erased area.

5. The method according to claim 1, which comprises starting the application program by remote access.

6. A data loading configuration system, comprising:
    a non-volatile memory;
    a file containing new data for basic system routines;
    a data processing system loaded with an operating system and having an operating memory connected to said file, said operating system having a kernel layer and an application layer, said application layer having an application program which can be called and initiates a loading of information with regard to hardware components from said file containing the new data for the basic system routines into said operating memory, said kernel layer having a driver program which can be called by said application program and serving for reading and transferring information with regard to the hardware components stored in said non-volatile memory;
    a first coupling connecting said application program to said driver program, such that it is possible to transfer the new data for the basic system routines and information for controlling a loading operation of the new data for the basic system routines into said non-volatile memory; and
    a second coupling connecting said driver program to said non-volatile memory, such that the new data for the basic system routines can be written to said non-volatile memory, wherein said driver program of said kennel layer of said data processing system writes into said non-volatile memory without a corresponding access from said application program of said application layer.

7. A data loading configuration, comprising:
    a non-volatile memory;
    a file containing new data for basic system routines;
    a data processing system having an operating memory loaded with an operating system and connected to said file, said operating memory having a kernel layer and an application layer, said application layer having an application program which can be called and initiates a loading of information relating to hardware components from said file containing the new data for the basic system routines into said operating memory, said kernel layer having a driver program which can be called by said application program and serving for reading and transferring the information relating to the hardware components stored in said non-volatile memory;
    a first coupling connecting said application layer to said kernel layer thereby connecting the application program to the driver program, such that it is possible to transfer the new data for the basic system routines and information for controlling a loading operation of the new data for the basic system routines into said non-volatile memory; and
    a second coupling connecting said kernel layer to said non-volatile memory, such that the new data for the basic system routines can be written to said non-volatile memory, wherein said driver program of said kennel layer of said data processing system writes into said non-volatile memory without a corresponding access from said application program of said application layer.

8. A computer readable medium containing computer-executable instructions for performing a method comprising:

calling an application program stored in an application layer, the application program initiating a loading of information with regard to hardware components from a file containing new data for basic system routines into an operating memory of a data processing system;

checking if a respective user has authorization in an event that the application program is called;

calling a driver program in a kernel layer by the application program, the driver program being prompted to read and transfer information regarding the hardware components stored in a non-volatile memory;

transferring the new data for the basic system routines and information for controlling a loading operation of the new data for the basic system routines into the non-volatile memory from the application program to the driver program; and writing the new data for the basic system routines to the non-volatile memory by the driver program from the kernel layer without a corresponding access from the application program of the application layer.

9. The computer readable storage medium containing program instructions for performing a method according to claim 8, which further comprises:

using the application program for performing a comparison for ascertaining an association of the information with regard to the hardware components stored in the new data for the basic system routines with the information regarding the hardware components stored in the non-volatile memory, and ending operations if no correspondence is determined in the comparison.

* * * * *